United States Patent [19]
Mueller et al.

[11] Patent Number: 5,140,587
[45] Date of Patent: Aug. 18, 1992

[54] BROADBAND RING COMMUNICATION SYSTEM AND ACCESS CONTROL METHOD

[75] Inventors: Johann R. Mueller; Wolfgang C. Moehlen, both of Langnau a. Albis, Switzerland

[73] Assignee: International Business Machines Corporation, Armonk, N.Y.

[21] Appl. No.: 696,426

[22] Filed: May 6, 1991

[30] Foreign Application Priority Data

Jun. 21, 1990 [EP] European Pat. Off. ........ 90810456.5

[51] Int. Cl.$^5$ .............................................. H04J 3/00
[52] U.S. Cl. ............................ 370/85.15; 370/85.12; 370/85.6; 340/825.05
[58] Field of Search ................. 370/85.15, 85.12, 85.9, 370/85.6, 85.1; 340/825.05, 825.5

[56] References Cited

U.S. PATENT DOCUMENTS

| 4,587,650 | 5/1986 | Bell | 370/85.15 |
| 4,916,690 | 4/1990 | Barri | 370/85.15 |
| 5,010,332 | 4/1991 | Egami | 370/85.6 |
| 5,043,981 | 8/1991 | Firoozmand et al. | 370/85.1 |

Primary Examiner—Douglas W. Olms
Assistant Examiner—Min Jung
Attorney, Agent, or Firm—Joscelyn G. Cockburn

[57] ABSTRACT

For a ring communication system, an access mechanism is provided and supported by medium access control means so that different kinds of traffic are optimally accommodated. Signaling information (SG) and isochronous data (IS) keep their position in a synchronous time raster while propagating on the ring, whereas variable-length data frames (DF A, DF B, DF C, DF D) can be relatively shifted in their position during propagation on the ring, to allow for the insertion of additional variable-length data frames (DF E, DF F), thus giving to all stations attached to the ring a fair chance for transmitting such data frames (DF). The data frames are partitioned into slot-size segments, and the mechanism guarantees that the segments of any data frame will not be interrupted by segments of another such data frame.

10 Claims, 6 Drawing Sheets

BROADBAND RING COMMUNICATION SYSTEM AND ACCESS CONTROL METHOD

DESCRIPTION

1. Field of Invention

Present invention is concerned with access control for communication networks using a transmission ring, in particular for systems providing broadband integrated services (i.e. for voice and data, or isochronous and asynchronous information).

2. Background

Ring communication systems have found broad application for interconnecting stations or nodes in a given area. For regulating access of the stations to the ring, i.e. for controlling the right to transmit data or system information, several principles are applied. Besides the widely used token access mechanism, these principles include also buffer insertion rings and slotted rings.

U.S. Pat. No. 4,002,842 (H. Meyr et al.) entitled "Time Multiplex Loop Communication System" discloses a system comprising a closed unidirectional transmission loop with plural stations coupled thereto. Each station can insert a delay buffer into the loop or remove it, thus allowing to send data while arriving (pass-through) data are delayed in the inserted buffer. However, only fixed-length blocks of register length can be transmitted and all data propagating on the loop are delayed by each transmitting station, so that no timely transmission of isochronous information is guaranteed.

An article by D. E. Huber et al. entitled "SILK: An Implementation of a Buffer Insertion Ring" published in the IEEE Journal on Selected Areas in Communications, Vol.SAC-1, No. 5, November 1983, pp. 766-774 describes a similar system in which a variable delay of the insertion buffer is provided. However, all data transmitted on the ring are delayed by each transmitting station and encounter an unpredictable overall delay (which is unsuitable for the transmission of isochronous data).

A publication by C. S. Lanier "Data Synchronization in an Asynchronous Ring Network Environment Utilizing Variable-Length Data Packets", IBM Technical Disclosure Bulletin, Vol. 26, No. 4, September 1983, pp. 1870-1873 discloses station attachment circuitry for a ring transmission network in which each station has a variable-depth insertion buffer to allow for accumulation of pass-through data while local origin data is being transmitted. Generally, data transmission is asynchronous and the mechanism is not well suited for isochronous information transfer.

An article by R. M. Falconer and J. L. Adams entitled "Orwell: a protocol for an integrated services local network", published in British Telecommunication Technology Journal, Vol. 3, No. 4, October 1985, pp. 27-35, describes a slotted ring communication system for integrated services, i.e. for speech as well as data traffic. In the protocol proposed, each node gets a given number D allocated which indicates the number of blocks the node can transmit in free slots before it must stop transmitting, to thus allow some free slots to pass for usage by other nodes. A mechanism (Trial) is provided to allow restoration of the allocated number D in each station in the situation when all stations have either exhausted their contingent or have no data to transmit. Though besides speech sample blocks, also data blocks may be transmitted, they have lower priority and if several slots must be used by a node for transmitting a larger data message (block), it cannot be guaranteed that they are carried in consecutive slots which is important when low overhead should be achieved.

European Patent Application No. 0'125'744 (Shortland et al.) discloses a closed loop communication system in which information is transmitted in a fixed time slot schedule. Besides circuit-switched information, also packet-switched information can be transferred through slots. Access right for CS information is derived in a connection establishing procedure; access rights for PS data is regulated by a token mechanism. With such a mechanism only one station can be transmitting PS data at a time, and long delays may thus be encountered when a heavily transmitting station keeps the token.

OBJECTS OF THE INVENTION

It is a primary object of the invention to provide an access mechanism for stations connected to a transmission ring, which enables timely transmission of isochronous information and of signaling or system information, which guarantees the transmission of portions of data blocks in consecutive slots on the ring, and which gives a fair chance for transmission to each station independent of its location on the ring and of the transmission demands of the other stations.

SUMMARY OF THE INVENTION

This object is achieved by a ring communication system as defined in claim 1, and by a method of regulating access to a ring transmission medium as defined in claim 5.

The advantage of this system and method is that, due to the variable delay for data passing through any station, the station can be guaranteed continuous transmission of a local data block not exceeding a given maximum length, but that nevertheless other stations may be simultaneously sending their local data blocks, while isochronous and signaling information are transmitted without delay.

This and other advantages will become more apparent from the following detailed description of a preferred embodiment of the invention which is explained with reference to the following drawings.

DEFINITIONS

Following are definitions for a few terms used frequently in the description:

Cycle Frame (CF) A time frame on the transmission medium, having a nominal length and comprising a predetermined number of slots Time Slot (TS) Basic unit of time on the transmission medium, having fixed length corresponding to a fixed number of bytes (e.g. 56 bytes)

Data Frame (DF) Block of information (data) to be transferred from one station to another; length is variable up to a maximum

DETAILED DESCRIPTION OF THE PREFERRED EMBODIMENT

1) System Principles

The communication system in which the present invention is to be used is a ring system (ring network with star-type wiring) to which several stations (nodes) are attached. Each station is connected to the ring transmission medium through MAC (Medium Access Control) circuitry which controls access to the transmission medium, transfer of data from the station to the transmission medium, and reception of data from the transmission medium.

Organization on Medium (FIG. 1):

On the transmission medium signals are transmitted in fixed length, synchronous time slots TS. One of the stations assumes the function of a monitor and provides the time slots (timing signals for time slots). A fixed number of time slots forms a cycle frame CF (see row 1A in FIG. 1). As an example, each cycle frame includes 42 time slots at a bit rate of approximately 162 MBit (without coding) and a CF time of 125 μsec. Each time slot (as will be shown with reference to FIG. 2) comprises e.g. 56 bytes, in which each group of 4 bytes forms a word. However, with slight modifications and a word length of 2 bytes (instead of 4 bytes), the slot size can be reduced e.g. to 54 bytes if desirable (i.e., 27 two-byte words).

The monitor station, by means of an elastic buffer, ensures that the propagation time around the ring corresponds exactly to one cycle frame or an integer multiple thereof.

Figure 1A:
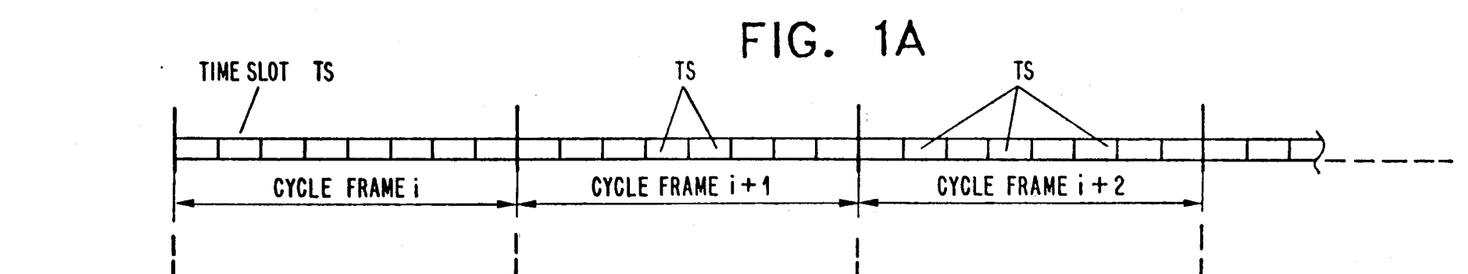
FIG. 1 illustrates the principle of cyclic and slotted information transfer on the ring, with different priorities and propagation speed for isochronous and signaling information as compared to asynchronous data.
Figure 1B:
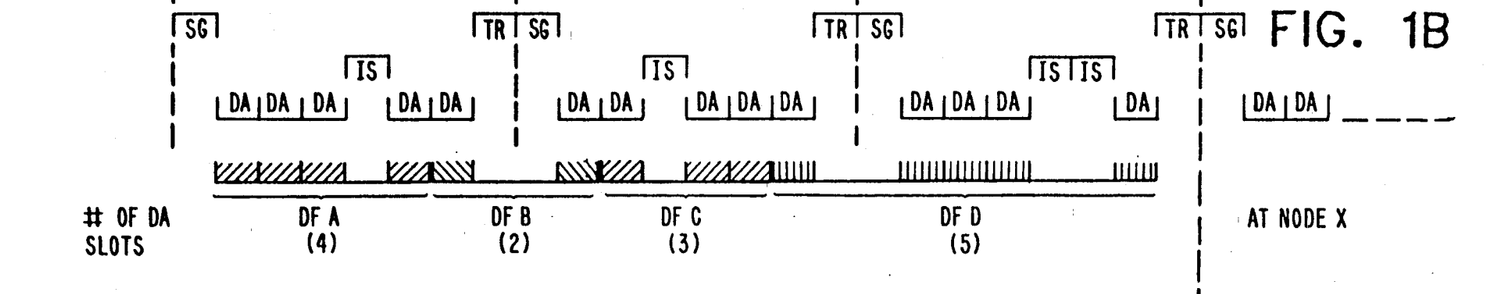
Figure 1C:
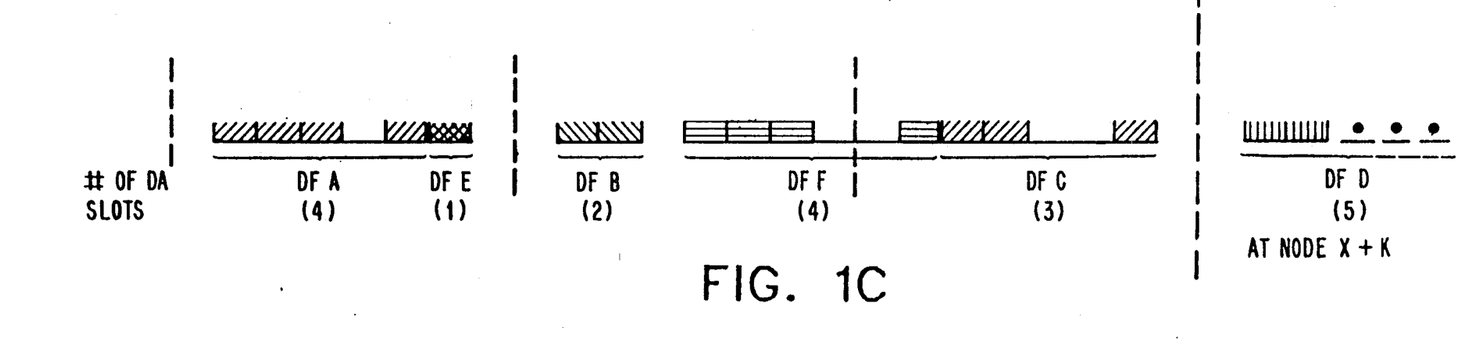

The first time slot (SG) of each cycle frame is used for signaling purposes. The last time slot of each cycle frame, which is designated in the following as trailing slot (TR) is usually left empty (dummy words) to allow for clock adjustment. The length of TR slots can be adjusted, as will be explained below.

All time slots between the SG and TR time slots are used for the transmission of data. Some of the data time slots (IS) are used for transmitting isochronous data (or more exactly, quasi-isochronous data as will be explained below), usually a small block having the length of a single time slot. Other data time slots (DA) are used for the transmission of asynchronous data. The stations generate and receive these data in the form of variable-length data frames DF (having their own inner structure which is transparent to the medium access control means). These data frames are partitioned for transmission into slot-size blocks which are inserted into consecutive time slots, as is indicated in row 1B of FIG. 1 for four data frames A, B, C, and D having a size of 4, 2, 3, and 5 slot lengths, respectively. As can be seen in FIG. 1, while the data of any data frame DF are contained in sequential time slots and are not interrupted by data of other data frames, there may be intervening SG, IS, and TR slots within the time slot sequence for a single data frame DF.

As is further shown in row 1C of FIG. 1, data of other additional DF frames (frames E and F) may be inserted between the data of data frames already being transmitted, but the data of any DF frame will never be interrupted by another DF frame's data.

It is assumed that each station has its own individual clock. Each station extracts the exact 125 μsec cycle frame time (corresponding to 8 kHz) via a phased locked loop. To allow for an adaptation in timing, stations can remove or insert 4-byte words into or from the TR slots, depending on the filling state of an elasticity word buffer they contain in their input circuitry. In the monitor station, the trailing slot TR of each cycle frame CF is restored to its original length of 56 bytes, so that all cycle frames have the nominal fixed length at the output of the monitor station. (If exact clocking (125 μsec intervals) were required, a Synchronous Bandwidth Manager acting as monitor can provide it.)

Figure 2:
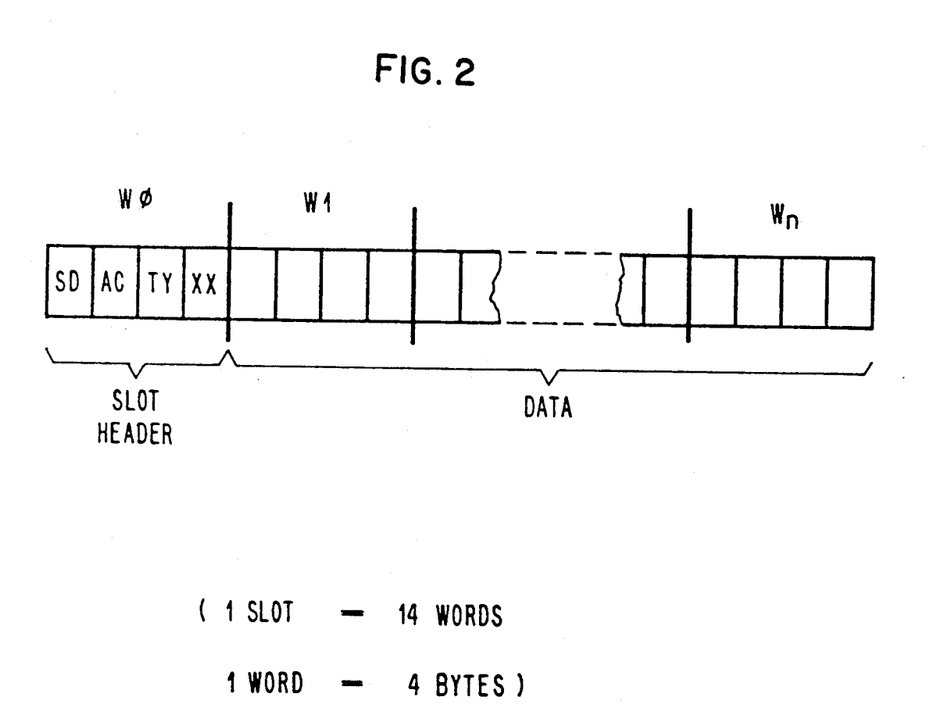
FIG. 2 shows the fixed-length time slot organization.

The time slot organization is shown in FIG. 2. For the present description, it is assumed that each time slot TS comprises 56 bytes which are organized in 14 words each including 4 bytes. While the first word W0 of each slot constitutes a slot header, all other words (W1 ... Wn) are used for carrying data (either isochronous data, or data sections from asynchronous data frames DF).

The four bytes of the slot header (W0) are designated as SD (Slot Delimiter), AC (Access Control), TY (Type), and XX (Reserved/Not used).

The SD byte contains, besides a slot delimiting code, an indication of the slot kind: Signaling slot (SG), asynchronous data frame slot (DA), isochronous data slot (IS), and trailing slot (TR). SG slots and IS slots (and also TR slots) are individual slots, whereas DA slots belong to a group which carries a data frame DF (in a special case, the group may of course consist of a single slot).

As was mentioned above already, the first slot of each cycle frame CF is always a signaling slot SG.

Contents of the AC byte is as follows:

| Bit No. | SG (Signaling) | DA (As. Data) | IS (Isochr.) | TR (Trailing) |
|---|---|---|---|---|
| 0 | B/F | B/F | B/F | — |
| 1 | R = 0/1 | R = 0 | R = 1 | — |
| 2 | Modifier | Modifier | — | — |
| 3 | Priority | — | — | — |
| 4 | ( Signal- | — | — | — |
| 5 | ( ing | — | — | — |
| 6 | ( Inform- | — | — | — |
| 7 | ( ation | ATM/other | ATM/other | — |

Bit 0 (B/F) of the AC field indicates whether the slot is busy (occupied) or free. Bit 1 is a reservation bit: SG slots may be reserved by the monitor unit; if they are not reserved, they can be used by any station if they are free; DA slots are never reserved (R=0), i.e. they can be used by any station if free (empty); IS slots are always reserved (R=1) by the monitor station (as will be explained below). Bit 2 is a modifier bit which is initially zero but which is set to one if the slot passes through the monitor station on the ring. This allows the detection and elimination of slots which propagate more than once around the ring. Bit 3 in the SG slots is a priority bit, to allow recognition of very important (high-priority) system signaling messages (e.g. credit assignment messages). Bits 4, 5, 6, and 7 in the SG slots carry an indication what kind of signaling information is transferred in the remaining portion of the slot. Such signaling information kinds may be: Trial message; Reset message; Monitor message; Ring management message;

Other information (with details in the data section of the slot).

The last bit (7) of the AC field in DA and IS slots indicates whether the slot carries ATM formatted information, or other information.

Bit positions of the AC field not having any indication in the above table may be used for any purpose by a specific system.

Contents of the TY byte have the following meaning: The first five bits (0 ... 4) indicate what type of format is valid for the data carried by the slot; this may be e.g. LLC, MAC, ATM, HPPI, or any other. Bits 5 and 6 of the TY byte indicate what the position of the respective slot is in a sequence of slots for one data frame DF. F=first slot (11); M=intermediate slot (10); L=last slot (01); S=single slot (00).

The last bit (No. 7) of the TY byte indicates whether the following XX byte of the slot header carries a "label". Such labels may be used in a system as abbreviated source or destination addresses. This allows routing of slots e.g. through bridges to other rings without detailed analysis of the full source or destination addresses (which will not be contained in the slot header but in the following data words of the slot). The monitor can assign labels via MAC frames at higher priority (via SG or IS slots).

In the XX byte of the slot header, there may be accomodated a label (see above) or any other necessary signaling or control information, depending on the specific system. In the case of ATM (with 53 bytes for each ATM cell) XX contains the first byte of the ATM specific header (cf. recommendation of CCITT SG XVIII), while the 52 data bytes of the slot (words W1 . . . Wn) contain the remaining 52 bytes of the ATM cell; the four bytes of word W1 may then contain VPI and VCI information (VPI=Virtual Path Identifier; VCI=Virtual Circuit Identifier).

The data words of each slot, i.e. W1 ... Wn, contain the following information, depending on the kind of slot:

Signaling Slot SG: The first words contain the destination address and the source address, the remaining words contain the actual signaling data.

(Asynchronous) Data Slots DA: The first slot F (DA/F) of a sequence of time slots used for a data frame DF carries the destination address, the source address, and in the remaining words actual data. An intermediate slot M (DA/M) carries only data. The last slot L (DA/L) of a sequence carries the last data of the respective data frame, a CRC field, and some empty words (if the end of the data frame DF does not exactly fill the last slot). If there is only a single data slot S (DA/S) because the data frame DF is very short, it will carry the destination and source addresses as well as the CRC field, besides the actual data.

Isochronous (Data) Slots IS: The first words of such slots may carry e.g. a virtual path ID and a virtual circuit ID, and the remaining words will carry the actual isochronous "data", e.g. voice samples.

As was mentioned above already, the isochronous slots IS may actually be "quasi-isochronous". This means that, though the information they contain is transferred in average isochronously, there may be momentaneous variations due to the collection of e.g. 48 voice samples for assembling a block of them, and the waiting of the respective station for the next free IS slot when it has completely assembled one block of isochronous information (e.g 6 μsec intervals based on ATM principles).

Trailing slot TR: It will not contain any specific information in its data words W1 ... Wn, because the TR slot is used only for synchronization purposes.

2) Access Control Principles

As was indicated above, information is transferred in the system on the medium in the form of time slots. Each station inserts, for transmission, a single "block" of isochronous "data" (e.g. voice, video, broadcast) into a single respective IS slot, or it distributes, into sequential DA time slots, the contents of a data frame DF which it keeps ready in a transmit buffer.

The number of isochronous slots (IS) available in each cycle frame CF is determined by a Bandwidth Manager BM which reserves a sufficient number of slots to guarantee the required bandwidth for isochronous transmission. The necessary bandwidth (number of IS slots) is determined by a signaling procedure (e.g. ATM) between stations and Bandwidth Manager, and any station must use only as many IS slots as it has previously reserved (and acknowledged by the BM).

For asynchronous (non-isochronous) data frames DF, all stations receive from time to time a "credit" of m data frames where m is a predetermined number. When the credit is exhausted, the respective station may no more start transmission of a local data frame DF unless it receives a new credit. The credit acquisition procedure will be explained later in a separate section.

Following are the basic rules for access to the medium (as illustrated in the flow diagrams of FIGS. 3A/B):

a) Signaling slots SG and isochronous slots IS have always highest priority; they must not be delayed by a station but must be immediately forwarded on the ring. (However, a delay of a few words duration is always effected in the receive portion of the station to allow interpretation of incoming information and reaction thereon if necessary. This is true for all kinds of slots, not only SG and IS slots.) Thus, SG slots and IS slots are treated as special slots.

b) Arriving (asynchronous) data slots DA may be delayed by a station, by inserting them into a delay buffer, to allow insertion of local data from a data frame DF waiting in the local transmit buffer. However:

b1) If for a slot sequence of a data frame DF which has begun to arrive, at least one slot was retransmitted on the ring, transmission of data from a local data frame DF must not be started; such transmission of a local data frame DF from a transmit buffer TB must only be started if no transmission of data slots from a data frame passing through that station is going on, and if at least one empty (free) data slot DA had arrived at that station.

b2) Once a local data frame DF was started to be inserted into sequential time slots, the transmission of this data frame should not be interrupted, except when an intervening signaling slot SG or isochronous slot IS (or trailing slot TR) arrives. Should a slot sequence of a data frame begin to arrive at a station during its sending of local data, the contents of arriving data slots must be delayed (by entering them into the delay buffer) until the whole local data frame DF was transmitted.

Figure 3A:
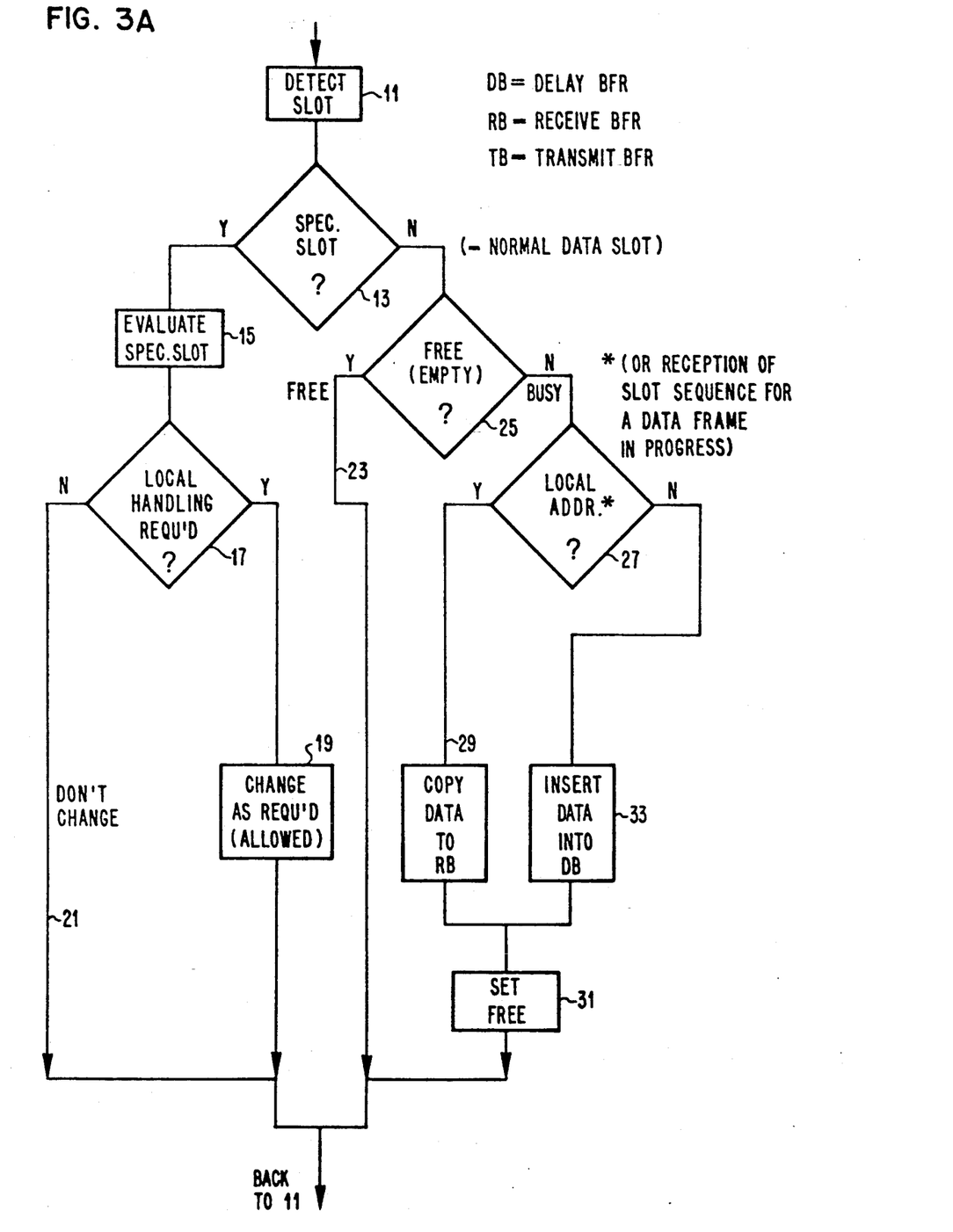
FIGS. 3A/3B are flow diagrams of the different steps in the receive function and the transmit function, respectively, that are provided in each station.
Figure 3B:
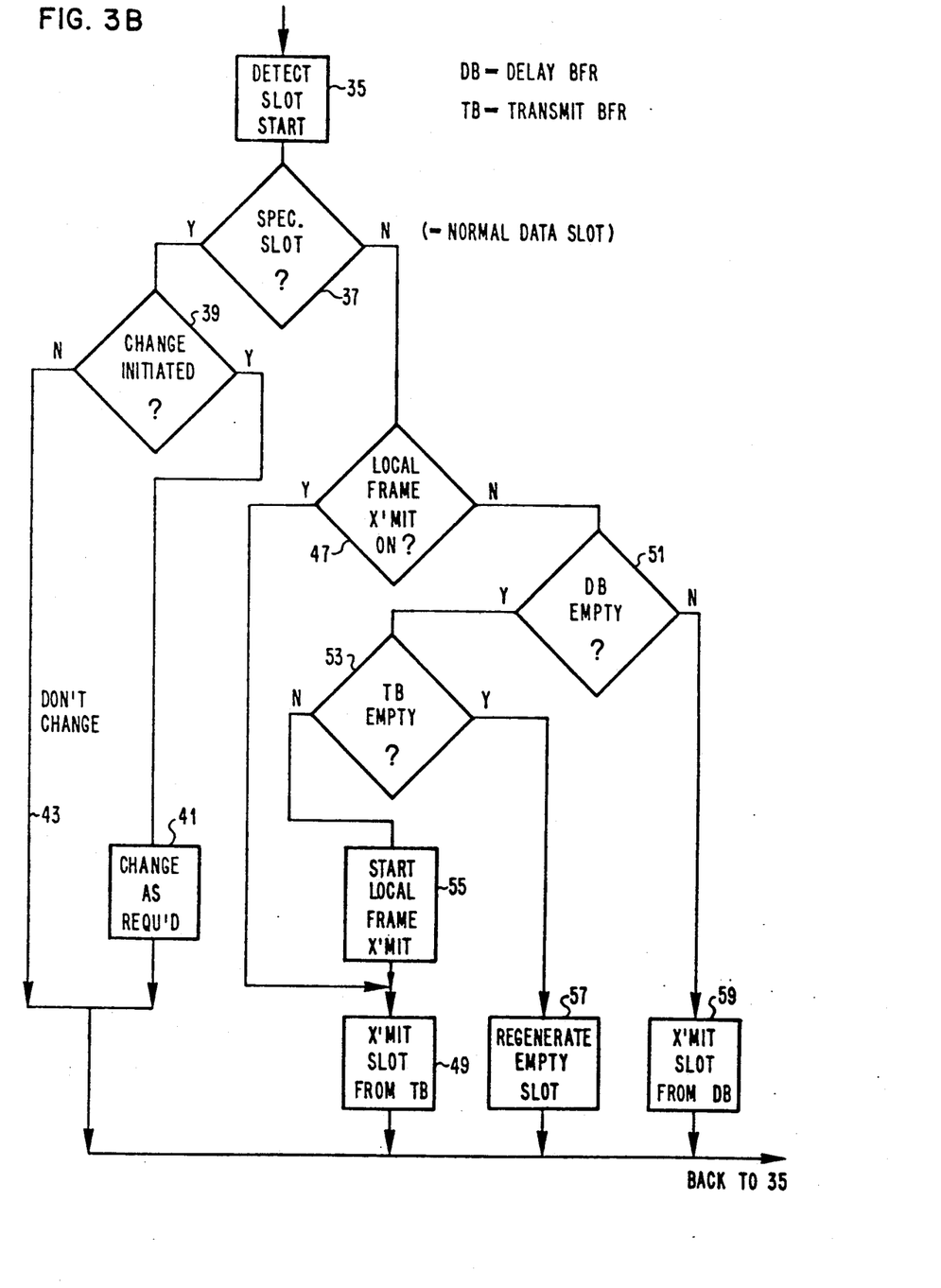

This access procedure (protocol) is illustrated in the flow diagrams of FIG. 3A and FIG. 3B. A separation is made between the receive functions and the transmit functions of each station, though they closely cooperate.

A) Receive Function (FIG. 3A):

The station MAC (medium access control) constantly tests for arrival of a slot (11). If a slot delimiter is detected, a test is made (13) whether it is a special slot (signaling SG or isochronous IS) or a normal data slot (DA). If a special slot arrives, the contents is evaluated (15). As a result, a determination is made (17) whether any local handling is required or not. Local handling will be required e.g. when the slot contains signaling data (SG) or isochronous data (IS) which are destined for the respective station, or when the station has to transmit signaling data and the SG slot was free. Thus, if local handling is required, the respective steps which can be done by the receive function (which may include a conversion from busy to free) are performed (19) and then the special slot is passed on. Otherwise, the slot is passed on without any change (21).

If it was determined that the slot is a normal data slot (DA), then a further test is made (25) whether the slot is free (empty) or occupied, by testing the B/F bit. If the slot is free, then no action is required on the receive part of the station. (Except that the send part is notified so that it can either issue a free data slot, i.e. regenerate the free data slot on the ring, or transmit locally buffered data in the respective slot). If the slot contains data, i.e. if it is busy (B/F bit=1), then another test is made (27) to determine whether the data words contain a local address (or, for an intermediate data slot and a last data slot, whether local reception had started because of recognition of a local destination address in the first slot of the sequence, and the slot sequence reception is still in progress). If a local address is seen (or reception of a slot sequence for a data frame had started previously), the data words of the slot are copied into a local receive buffer RB (29). Thereafter, the slot is set to "free" (31) (so that the send section of the station can use the slot for data transmission or can issue a regenerated empty slot).

If no local address is seen (and no reception of a data frame slot sequence had started previously), the arriving data slot is copied (33) into the local delay buffer DB (for later retransmission, or for immediate retransmission if the delay buffer is empty). The slot is then set to "free" (31). The transmit section is then notified so that it can use (reissue) these slots from which data had been copied.

B) Transmit Function (FIG. 3B):

The transmit function does the further handling of slots which had been processed already by the receive function of the same station.

It constantly tests whether a slot start occurs (35), and whether a slot is a special slot SG, IS or a normal data slot DA (37). If a special slot is seen, a test is made (39) whether a change of the slot's contents was initiated by the receive function already. If that is the case, the transmit function will do the required change (41), e.g. insertion of signaling data, and then release the slot for further transmission on the ring. If no change was necessary, the slot is released for further transmission without inserting any information (43).

If the slot is a normal data slot, a test is made (47) whether a local transmission is in progress (i.e. whether transmission of a local data frame DF had started previously and is not yet finished). If the answer is positive, one slot contents is taken from the transmit buffer TB (where the remainder of a data frame is waiting for transmission) and inserted into the slot (49) for transmission on the ring.

If no local transmission of a data frame was in progress, another test is made (51) to determine whether the station's delay buffer is empty or not. If the delay buffer is empty, a test is made (53) whether the transmit buffer is empty or not to determine whether a local data frame DF is waiting for transmission. If TB is not empty, the transmission of the local data frame is started (55) if a credit is still available, and one slot's contents is taken from the TB and inserted into the slot for transmission (49). If neither the delay buffer nor the transmit buffer have any data waiting for transmission, the respective slot is regenerated empty (free) for further propagation on the transmission ring (57).

If the delay buffer was not empty (51), it has priority over the transmit buffer (provided no local data frame transmission was in progress), and one slot's contents is taken from the delay buffer DB and inserted into the slot (59) for retransmission on the ring (except for occasional transmission of a high priority short MAC frame e.g. from the monitor). The delay buffer must have a size of the maximum data frame length (plus some overhead of e.g. 10 slots for occasional high priority MAC messages).

This procedure (protocol) guarantees that the signaling and isochronous information is transmitted around the ring at the highest possible speed, i.e. the actual transmission speed of signals on the ring, whereas the asynchronous data may have a slower speed because they may be delayed during their propagation around the ring, to allow intermediate insertion of other data frames (as is illustrated in FIG. 1); however, the data of one data frame are always kept together (except for intervening single signaling or isochronous or trailing slots).

In other words, transmission priorities are as follows: (a) Signaling and isochronous information; (b) local data of a data frame for which transmission had started already; (c) data stored in the station's delay buffer; (d) data of a local data frame for which transmission had not yet started.

3) Implementation

Figure 4:
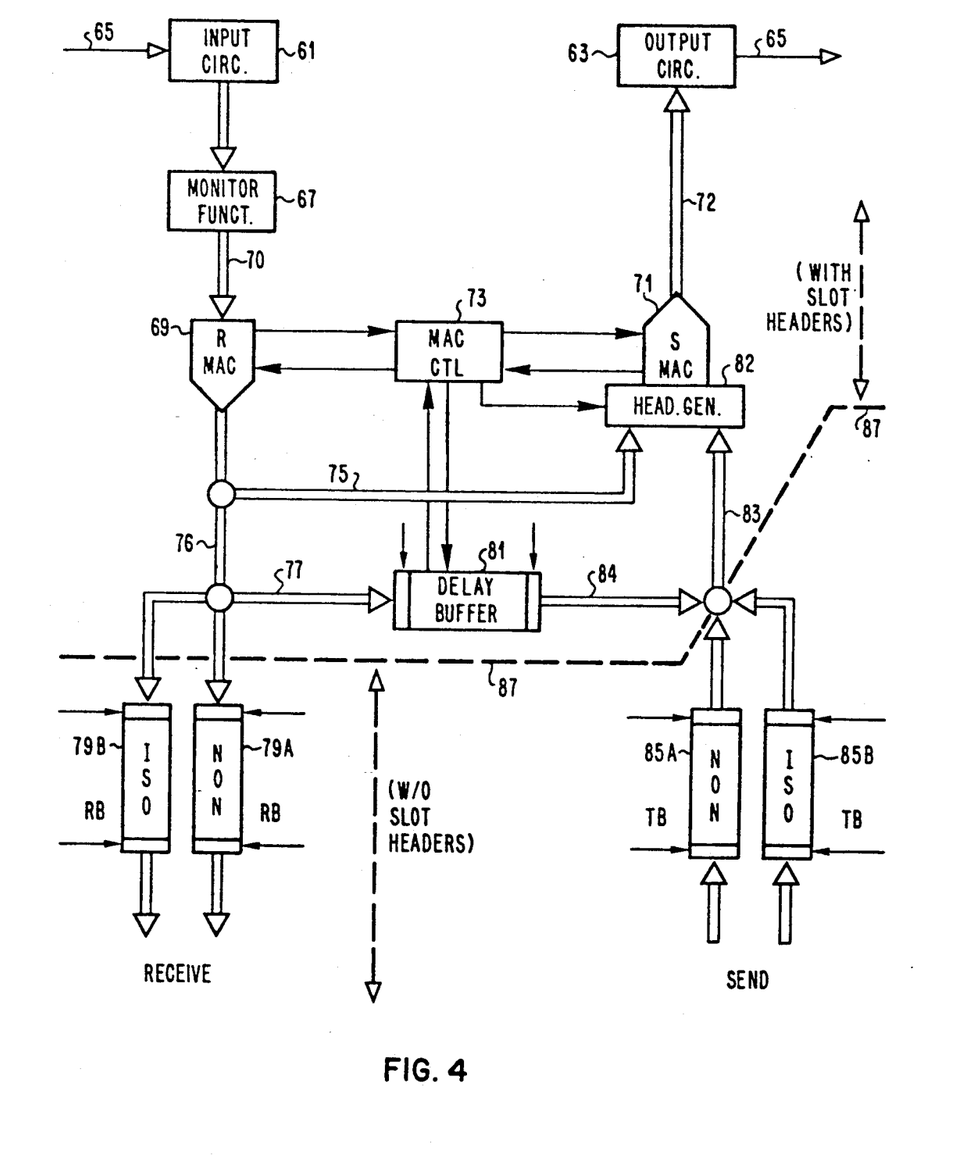
FIG. 4 is a block diagram of the medium access control (MAC) apparatus of each station.

The basic block diagram of an implementation of these functions in the medium access control section of a station is shown in FIG. 4.

Input circuitry 61 and output circuitry 63 are provided for signal conversion between the transmission medium (ring 65) and the station circuitry. The conversion may include optical-electrical conversion, serial-parallel and parallel-serial conversion, and synchronization.

A monitor function (67) is provided in each station. It will be activated in one of the stations when the system is initialized (started). The monitor selection may be done by any one of several known procedures, e.g. that defined in IEEE Standard 802.5. During operation, when the active monitor fails, the monitor function of another station will be activated. All data transmitted on the ring pass through the monitor so that it can do checking (of a modifier bit), synchronization, and other functions for the whole system.

At the input side of the station, there is provided the Receive Medium Access Control portion (Receive MAC, R MAC 69) connected to the input circuitry 63 by input bus 70. The Receive MAC has a delay buffer of a few words length (e.g. four words) to allow interpretation and immediate rection on the arriving information. It executes the tasks shown in the flow diagram of FIG. 3A. On the output side, there is provided a Send Medium Access Control portion (SEND MAC, S MAC 71) connected to output circuitry 63 through output bus 72. It executes the tasks shown in the flow diagram of FIG. 3B. Both MAC portions are controlled by a Medium Access Controller (MAC Controller, MAC CTL 73). This controller also exchanges control signals with other portions of the station (e.g. the delay buffer).

A bridge bus 75 interconnects the incoming (receive) and outgoing (send) sides of the station to allow direct, unmodified, and undelayed transfer of the data contained in special slots (SG, IS) arriving at the station (except for a few words delay in the Receive MAC, as explained above).

On receive bus 76 and receive branch bus 77, arriving data can be transferred into receive buffers 79A and 79B and into the delay buffer 81 of the station. On send bus 83, local data can be transferred from the station's transmit buffers 85A and 85B, and also via send branch bus 84 from the delay buffer 81, to the Send MAC 71 for transmission on the ring.

On the transmission medium (optical ring 65) each slot is preceded by a slot header as is shown in FIG. 2. This slot header is only available in units and on busses which are located upwards of the dotted line 87 in FIG. 4. A slot header is stored in the delay buffer 81 when a slot's contents is transferred into it, but is stripped off when the contents of a slot is inserted into receive buffers 79A and 79B.

In connection with the Send MAC 71, there is provided a slot header generator 82 which, under control of the MAC Controller 73, generates appropriate slot headers to precede the data which become available on output bus 83, for transfer (through the Send MAC 71) to the ring transmission medium. The slot header generator also regenerates or updates the slot headers transferred through bridge bus 75 or retransmitted from delay buffer 81.

As is indicated in FIG. 4, there is a receive buffer (RB) 79A for non-isochronous data which are extracted from normal data slots DA, and a receive buffer (RB) 79B for isochronous data which were extracted from an isochronous slot IS. (For certain high-priority systems messages, there may be provided an express receive buffer which is not shown in FIG. 4, to allow their separate handling.) Similarly, there is a transmit buffer (TB) 85A for non-isochronous data frames DF to be inserted into normal data slots DA, and a transmit buffer (TB) 85B for isochronous data to be inserted into an isochronous slot IS.

Extraction of received data from the receive buffers, and insertion of local data into the transmit buffers need not be described here because it is a standard procedure. It should be mentioned again, however, that each station prepares local data for transmission in the form of variable-length data frames DF, and that the medium access control portion of each station takes a slot's payload of data at a time from such a data frame DF, for insertion into one time slot TS for transmission. The transmit buffer 85A has a capacity of e.g. two maximum-length frames. They are fed from the station's own internal data frame buffers when space becomes available in the respective transmit buffer (transfer between buffers e.g. in words of four bytes at a time).

In the following, some more details of the Receive MAC and Send MAC apparatus will be described in connection with FIG. 5.

Figure 5:
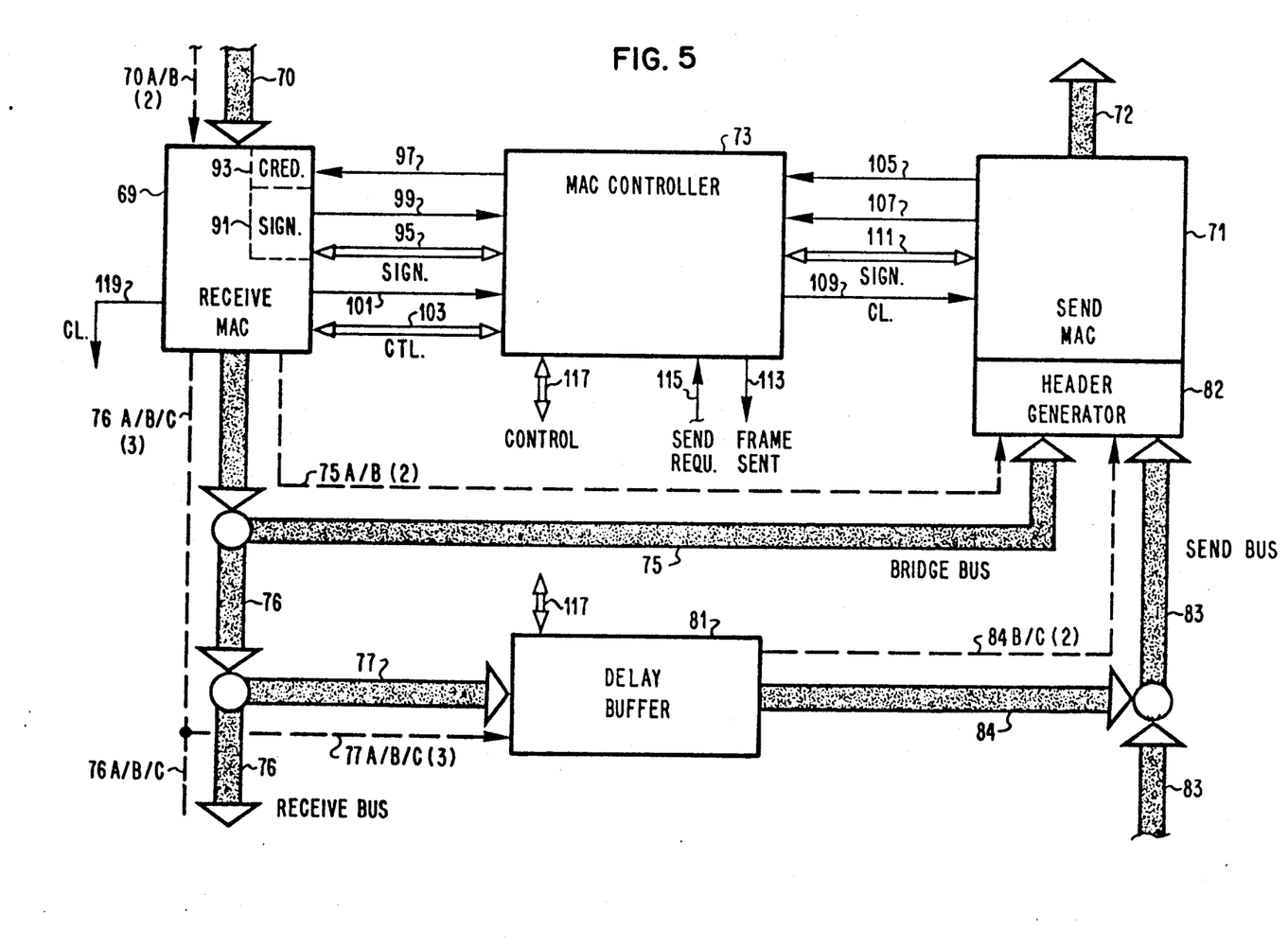
FIG. 5 shows some more details and interconnections of the station MAC apparatus of FIG. 4.

Details of MAC Circuitry/Apparatus:

FIG. 5 shows some more detail of the MAC (medium access control) apparatus which interconnects a station's buffers with the transmission medium. It corresponds to a portion of FIG. 4, and the same reference numbers have been used for units which are shown in both figures.

In FIG. 5 there can be seen Receive MAC 69 with its input bus 70 (which is connected to the input circuitry), and Send MAC 71 with its output bus 72 (which is connected to the output circuitry of the station). Also shown are MAC Controller 73, Slot Header Generator 82, Delay Buffer 81, Bridge Bus 75, Receive Bus 76, Receive Branch Bus 77, Send Bus 83, and Send Branch Bus 84.

FIG. 5 shows in addition particularly the interconnections between these units and indicates the signals which are transferred to achieve the operations illustrated in the flow diagrams of FIGS. 3A/B.

The Receive MAC 69 has a signaling portion 91 including a credit acquisition portion 93 which receives the credits which are "distributed" to each station (to be explained in more detail later). A signaling bus 95 interconnects the Receive MAC 69 and the MAC Controller 73 for exchanging signaling data. Also, indicator line 97 for a signal "credit exhausted" and indicator line 99 for a signal "new cycle frame" are provided. Furthermore, a control line 101 for the slot clock start signal, and a control bus 103 (e.g. for loading of addresses to be recognized by the station) are provided between Receive MAC 69 and MAC Controller 73.

The Receive MAC 69 has also a delay register of several words to allow for interpretation and, if required, modification of the AC field in slot headers (as was indicated above already) after detection of the station's own address.

Between the MAC Controller 73 and the Send MAC 71, the following connections are provided: A signaling line 105 for a signal "sending of data frame finished"; an error indicator line 107; a slot clock line 109; and a signaling bus 111 for various signaling and control signals.

In parallel to the input bus 70 which interconnects the input circuitry 61 and the Receive MAC 69, there are provided two indicator lines 70A and 70B which carry the following signals: A) Cycle frame start detected; B) Slot delimiter detected.

In parallel to the Bridge Bus 75, there are provided two indicator lines 75A and 75B which (in coded form) indicate whether the received slot transferred over bridge bus 75 is a signaling slot SG (11), an isochronous slot IS (10), or a trailing slot TR (01) of a cycle frame.

In parallel to the Receive Bus 76, there are provided three control lines 76A, 76B, and 76C. Also, in parallel to Receive Branch Bus 77, three control lines 77A, 77B, and 77C are provided. The signals on them indicate in coded 3-bit form ABC the following: 010=single slot frame DA/S; 011=first slot of a data frame slot sequence DA/F; 000=intermediate slot of a data frame slot sequence DA/M; 011=last slot of a data frame slot sequence DA/L. Thus, a binary zero on line 76A (77A) always indicates the reception and transfer of a data frame slot. A binary one on line 76A (77A) indicates the reception and transfer of an isochronous slot (the signals on lines 76B (77B) and 76C (77C) will have no meaning then).

These signals are maintained on the respective lines as long as data words for the respective time slot are received and transferred on busses 76/77 so that the input buffers 79A and 79B as well as the Delay Buffer 81 can correctly store the received words (four-byte groups) of a slot, and can reassemble a data frame which was distributed over several slots.

In the Delay Buffer 81, the binary values of the signals on lines 77B and 77C are stored together with the first word of the word sequence for the respective slot, so that the indication of single, first, intermediate and last slot of a data frame slot sequence will be available when the respective data are read out from the Delay Buffer for retransfer on the ring. In parallel to outgoing bus 84 from the Delay Buffer 81, there are provided two lines 84B and 84C for these indications (S/F/M/L) so that they can be transferred together with the first word of that slot into slot header generator 82 for insertion into the slot header for the retransmitted slot.

Finally, there are provided two lines between the station's internal control section (not shown here) and the MAC Controller 73: Line 113 for indicating "one frame sent" to the station control section; and a line 115 for indication from the station to the MAC Controller a new send request. A control bus 117 is provided between the MAC Controller 73 and the Delay Buffer 81 for resetting and initializing the delay buffer (e.g. after certain error conditions in the MAC operation) and further for controlling slot write-in and read-out, for buffer management, and for problem indication.

The Receive MAC 69 also issues on line 119 the slot clock which is derived from the signals received on the transmission medium. This clock signal is distributed to the receive buffers (79) and the Delay Buffer 81.

Operation of MAC Circuitry:

In the following, the various functions and operations of the medium access control apparatus in a station are reviewed.

A) RECEIVE AND SEND FUNCTIONS IN GENERAL

Receive Part

The major task of this part is the interpretation of the incoming information in the access field and to derive the necessary control steps to properly gate the input and output data. The derived information is delivered to the MAC controller.

Of particular importance is the signaling slot (outband signaling) at the beginning of each cycle frame CF. The receive MAC part allows reading from and writing into this field. From this field, the necessary information for the distributed credit acquisition process is derived. The signaling slot access field can be overwritten, e.g. a Trial message can be erased (to stop its circulation on the ring, when a station still has credits and data to send). Also a station can replace its own Trial by a Reset message after a successful circulation on the ring. Short addresses (linear address space) can be used for the signaling slot if desired. The signaling slot is supervised by the station in which the monitor function is activated. The monitor function is invoked when the modifier bit in the access field arrives with M=1. When in any slot the busy bit is on and the reserve bit is not set and the monitor bit is one, the slot is set empty (garbage control). The signaling slot can also be used for other network control functions. The monitor control function also provides cycle frame synchronization, in the sense that it ensures integer numbers of cycle frames on the ring. Every station has the capability to become a monitor, as provided e.g. in IEEE Standard 802.5.

Receiving of Frames:

If the Receive MAC detects the arrival of a new data frame (data slot busy and type field indicates first slot of a frame), the address field is checked for an address match (against own address). If the match check is positive, the MAC Controller is informed in order to enable the transfer into the station receive buffer via read gates (in 4-byte words).

If no match is detected, the data frame will be delivered slot by slot (including delimiter, AC, TY, etc. in 4-byte words) to the delay buffer (there may be two delay buffers for different priorities). Reading into any one of the receive buffers (which may include an express buffer for urgent MAC frame reception) or into the delay buffer is disabled for at least a slot period when a signaling slot or an isochronous slot (or a trailing slot) arrives. A signaling slot is always passed via the bridge bus (modified or unmodified) to the Send MAC (again in 4-byte words). An isochronous slot is also passed on the same way to the Send MAC (busy or free), however the isochronous slot contents is fed simultaneously into the station's isochronous receive buffer if a VCI compare was positive. The above statement about the isochronous slot is only true of course when it is marked busy. The isochronous slot can be overwritten at the send side when an address match occured (full duplex operation).

Unpacking of a frame destined to said station is executed within the receive buffer control circuitry. For every priority, two receive buffers must be provided in order to allow overlap of writing into and reading out of the station receive buffers.

While a station receives a data frame on the receive bus which is destined for said station, any frames waiting in the delay buffer (higher priority first) are read out onto the send bus. If a station sending process was underway while a frame arrives on the receive bus that process is not interrupted. In the case described above, when a frame arrives which is destined for the respective station, and no sending occurs (delay buffer empty and no station frame send process ongoing), the MAC controller causes the Send MAC to create empty slots as output (Word W0: SD, AC=nonbusy, rest=idle).

The Receive MAC part has a few words delay to allow enough time for address detection before deciding were to enter the incoming frame.

Send Part

The Send MAC has the task to supervise the sending of data stored in the delay buffer and in the station transmit buffers. It is also under the control of the general MAC Controller. The Send MAC must of course be instructed when to enable the delay buffer or the transmit buffers. It must also be instructed when to interrupt a send process for bypassing of a signaling slot or isochronous slot. The Send MAC must also inform the MAC Controller when a send process is terminating (end of frame).

A further task of the Send MAC is the formatting of the frames coming from the transmit buffers, since the information therein is stored in nonslotted form. Only the first 4-byte word contains the Type field and the length of the frame in slots (not in words), the latter could be provided in addition. The control flags indicate first word (and slot of course) and last word, so that the station knows when to stop.

When the Send MAC takes data from the delay buffer via the send bus the control flags keep the same meaning as on the receive bus. The first word of a data frame coming from the station transmit buffer must be modified before being passed along. The AC field must be entered at the right position.

Summary

Following is a short recapitulation of the handling of slots by the receive part and the send part in the MAC section of each station: (a) Signaling slots SG and isochronous slots IS, i.e. special slots, are always directly transferred through the station via a bridge bus. If they contain data for the respective station, these are copied and the slot set free. Free special slots can be either used by the station for transmitting signaling or isochronous data, or they are retransmitted free. (b) Data from normal slots DA are always copied: either into the delay buffer, or into a receive buffer (if addressed to the station). For normal slots arriving free, nothing is entered into any buffer. For each normal slot DA which arrived, a normal slot leaves the station, either with data from a delay buffer or transmit buffer (selected by priority rules in the MAC protocol), or designated as free if no data are buffered for transmission. If transmit and delay buffers are empty, any arriving data that were copied into the delay buffer will be immediately retransmitted therefrom.

B) DETAILED OPERATIONS OF RECEIVE MAC AND SEND MAC

Receive MAC

Always recognize first word W0 of a slot, indicated by two indicator lines (70A/B). Three possibilities: either signaling slot (first slot in the cycle frame); or a slot for isochronous or non-isochronous data traffic; or a trailing slot of a cycle frame (only used for clock synchronization, not for data).

Provide a three or four word delay in order to allow enough time for analysis of W0 which contains in Byte 2 AC (Access Control) and in Byte 3 TY (Type) information (MAC frame, or LLC frame, or ATM or else), with the last two bits indicating whether the slot is the first, intermediate, or last for a data frame, or is the single slot for a data frame. Byte 4 could contain length in words (4 bytes) for the last slot or single slot of a data frame.

Word W0 of a slot field is never changed at the Receive MAC (when not belonging to a signaling slot).

W0 is always checked for Byte 2 (AC) to indicate busy and Byte 3 for type and first/intermediate/last or single slot of a data frame. AC is also checked for isochronous slot.

If busy is detected and start of a frame: check destination address in word 1 and 2 for own address. If YES, enable appropriate receive buffer, for the duration of the frame until the end of the last slot. Gating is only masked when a signaling slot is present or when a non-isochronous reception is interrupted with an isochronous reception. The MAC controller is immediately informed when a non-isochronous frame (with own address) starts and when it ends, in order to manage the delay buffer and the transmit buffers correctly, namely according to credits and priorities and the status of the delay buffers (empty or not). Isochronous slots are not fed into the delay buffer, instead they are like the signaling slot fed directly to the Send MAC.

The busy status of the isochronous slots is managed by the station with the monitor function.

It is the task of the station receive buffer input control to strip away the access control information, the type byte and to recognize the last word of a frame and to detect the valid number of words in the last slot and to recognize the CRC.

Signaling

The Receive MAC also recognizes the signaling slot. In this slot the Receive MAC also provides a simple write function, e.g. inserting Trial or Reset depending on the state of the MAC controller, and inserting the station address. This process is under the control of the signaling state machine in the controller, which ensures that the station takes proper action to ensure correct operation for the distributed credit granting system.

The access control field of the signaling channel is slightly different from the access control field in the isochronous and non-isochronous slots. The signaling for credits is described in a separate paragraph.

The Receive MAC does not create empty slots (except when signaling if necessary) when frames are terminating at the station receive buffer. This is the task of the SEND MAC which is under the control of the MAC controller, which gets informed when frames terminate at the station, or when the delay buffer is empty and no send request exists and when e.g. empty slots arrive. Receive MAC recognizes empty slots and informs the MAC controller.

Send MAC

The Send MAC is under the control of the MAC controller.

The Send MAC selects the signaling slots from the receive bus as well the isochronous slots and the trailing slot (empty words).

The Send MAC is informed when to select data for transmission over the send bus, either from the delay buffer or from the transmit buffers. Information from the delay buffer is taken unchanged (whole slots, including W0 and control flags) and transferred to the Send MAC.

The local send process either from the delay buffer or the transmit buffer (station data) will be interrupted for the duration of a signaling slot, an isochronous slot, and the trailing slot. In the case of an ischronous slot transfer it can happen that data words must be inserted from the isochronous transmit buffer. The transmit buffer will be informed by the MAC controller which was (upon detection of own VCI address) triggered by the Receive MAC.

When sending from the station buffer is initialized, the formatting into slots is executed by the Send MAC, which in turn extracts data word by data word from the appropriate buffer. The first word of a frame (4 bytes residing in the buffer) contains the parameters, such as type and length in words (e.g. max. 2000 words). From this the formatter can form the first word in every slot. Furthermore it can compute the length in number of slots (to indicate last slot in type field) and length of used word field in last slot. The first word in the frame buffer is also read into the Send MAC via the send bus. The Send MAC has also a minimum delay of one word, to allow some time for the modification of the first word W0 (AC and TY) to be sent off.

The end of the send process is reported to the MAC controller together with the number of slots needed.

This is also true for reading from the delay buffer. This facilitates the delay buffer management.

The Send MAC is also responsible for creating free slots in word W0 under the control of the MAC controller.

4) Credit Acquisition Procedure

A) General

As was indicated already, a credit for sending a predetermined number of data frames is given at regular intervals to each of the stations. This is to avoid that one station can dominate the ring system for some time (to avoid unfairness). When the credit is exhausted, the respective station cannot send any data frame even if free slots are detected on the transmission ring. Credit distribution is described in the next section.

It should be noted that no credit is necessary for sending isochronous data. For these data, a station must ask for establishment of a virtual connection prior to sending such data at the desired rate. Only if the monitor station or a bandwidth manager responds to such request with grant of a virtual connection, the respective station can then use free isochronous slots it sees arriving on the ring. The monitor station issues in each cycle frame CF the necessary number of isochronous slots with the "reserved" mark set.

It should further be noted that the transmission of isochronous data may be quasi-isochronous. This means that, though on average the necessary transmission rate for isochronous data is achieved, there may be temporary deviations (which are due, e.g. to the fact that isochronous data are collected to have a full slot's payload available for transmission, and that any station must wait for the next free isochronous slot before it can transmit).

B) Details of Procedure

For achieving a fair transmission chance for all stations, credits are given to each active station at the beginning of each one of consecutive "credit cycles". Each station at the begining of a credit cycle receives m credits (tokens), and is allowed to send up to m data frames DF during a credit cycle. The duration of credit cycles varies and is dependent on the activity of all stations. The maximum value of m should correspond to the number of average frames transmittable in about two ring delays.

A station that has exhausted its credits enters a "paused" state and stops transmission of further data frames. This releases transmission capacity for downstream nodes. A station which still has credits but has no local data frames waiting for transmission enters an "idle" state. Ring operation continues until all stations are paused or idle.

Stations in the paused or idle states are unable to send. Each such station uses the service channel constituted by the signaling slots SG occuring at the beginning of each cycle frame, to transmit a "Trial" message. (A trial message contains the sending station's own address as source address to ensure removal by the issuing station. This source address may be accomodated in Byte 3 (=XX) of the slot header (=W0) of the respective SG slot). Every station checks for these messages, and a station encountering a trial message while it is neither in the paused nor in the idle state cancels the trial message (e.g. by setting the B/F bit to free which invalidates the signaling data carried in the respective slot). Finally, when all stations are either in the paused or in the idle state, a trial message will propagate around the whole ring and return to the station where it was issued.

A station seeing its own trial message return will convert this into a "Reset" message and retransmit for propagation around the ring (reset is a broadcast message which will be received by all stations). Each station, when receiving the reset message, will reset its credit count to the initial value of m.

C) Modifications

As a further improvement, some modifications can be provided in the basic credit acquisition procedure which was explained above.

(1) Early Trial Prior to Complete Credit Exhaustion

A disadvantage of this basic credit acquisition procedure is the fact that all stations, i.e. the whole ring must be idle before a new credit cycle is started. An improvement would be as follows: Each station which has used half of its credits (i.e. which still has m/2 credits) already transmits a trial message (repeatedly). It then can still transmit further data frames (while its trial message circulates around the ring and is possibly removed) until the total of m credits is exhausted; then it really must enter the paused state and issue another trial message if no reset message for credit renewal was received in the meantime.

(2) Individual Credit Value for each Station

The credit m could be assigned on an individual basis, i.e. a station i would be assigned its credit value m(i) by an initial signaling procedure and would reset its credit limit to this individual number each time it receives the reset message. The general value for m must be chosen large enough to ensure that the loss in utilization due to rotation times for trial and reset messages is small, which would mean that m should last for at least two rotations. The optimum credit value m could be obtained e.g. by simulation.

3) Throttling of Credit Value

To adapt to current traffic situations, a throttling mechanism could be provided for the credit value m. The monitor station would then be provided with a mechanism to survey the traffic, e.g. by measuring the duration of credit cycles between two resets. In case a given limit were surpassed, the credit value m would be reduced. With each reset message, the current credit value would then be distributed, or the reset message would contain a binary control value indicating whether the stations must reset their credits to the normal value m, or to a predetermined lower value for the next credit cycle.

4) Partial Credit Consumption

If a station sends many short messages (e.g. MAC signaling messages which are not transferred through signaling slots SG but through normal data slots DA), it would be a severe disadvantage if a full credit "point" must be used for each such message. Therefore, a mechanism can be provided to use only partial credits for such short messages. An extra counter for partial credits would be provided whose contents is increased for each transmission of a short message (without changing the remaining basic credit value). When the partial credit counter overflows, e.g. after transmission of eight short messages, it would cause one "point" to be taken from the remaining basic credit for the station, and the partial credit counter would be reset.

We claim:

1. Ring communication system for the transfer of information between a plurality of stations connected to a ring transmission medium; signals being transferred on said ring transmission medium in a fixed time raster comprising time slots; each said station comprising transmit buffer means for holding a frame of local data to be transmitted, and delay buffer means for storing the contents of time slots which were received on said ring transmission medium and are to be retransmitted thereon; each of said time slots carrying an indication whether it is free or busy; and each of said time slots further carrying an indication whether it is a normal time slot or a special time slot;

said system further comprising in each station:

first transfer means (75) for transferring the contents of each special time slot (SG, IS) received at the input (61, 69, 70) of said station, through a direct path to the output of the station for further transmission on the ring;

second transfer means (83, 84) for transferring data either from said transmit buffer means (85A, 85B) or from said delay buffer means (81) to the output (63, 71, 72) of said station for transmission in a normal time slot (DA) on said ring when no contents of a special time slot is transferred through said station by said first transfer means; and third transfer means (77) for transferring the contents of a normal time slot (DA) received at the input of said station, into the delay buffer means if the slot carries a busy indication and the contents is not addressed to the respective station.

2. Ring communication system according to claim 1, further comprising in each station:

receive buffer means (79A, 79B) for the reception of data, and fourth transfer means (76) for transferring the contents of time slots which are addressed to the respective station, into said receive buffer means.

3. Ring communication system according to claim 1, further comprising in each station:

medium access control means (69, 71, 73) for controlling the transfer of time slot contents through said first, second, and third transfer means (75; 83, 84; 77), and the storing of data into and reading of data from said delay buffer means (81), and the reading of data from said transmit buffer means (85A, 85B); and header generation means (82) for generating slot headers for data read from said transmit buffer means (85A, 85B), and for regenerating slot headers for data directly transferred through said first transfer means (75), or for data read from said delay buffer means (81).

4. Ring communication system according to claim 3, wherein said header generation means (82) is adapted to generate, under control of said medium access control means (69, 71, 73), a slot header for an empty slot when no contents of a special slot (SG, IS) is transferred through said first transfer means (75) and no data are transferred from either said transmit buffer means (85A, 85B) or said delay buffer means (81) to the output (63, 72) of said station.

5. A method of regulating access to a ring transmission medium in a communication system comprising a plurality of stations connected to said ring transmission medium, information being transferred on said ring in time slots in a fixed time raster, each said time slot carrying an indication whether it is free or busy, each of said stations comprising transmit buffer means for a frame of local data to be transmitted on said ring, and delay buffer means for temporarily holding data received on said ring, for further retransmission from said station on said ring;

said method comprising the steps of:

designating each of said time slots as either a normal slot (DA) or a special slot (SG, IS);

transferring the contents of each of said special slots (SG, IS) through each station without storing it in said delay buffer;

transmitting in each station data from either said transmit buffer means (85A, 85B) or said delay buffer means (81) in a normal slot (DA) on said ring, when no special slot is received whose contents is directly transferred through said station, and when data are contained in one of said buffer means (81; 85A, 85B); and transferring in each station the contents of a normal slot (DA) received on said ring and carrying a busy indication, into said delay buffer means if it is not destined for the respective station;

whereby the contents of special slots (SG, IS) remain in their relative position in said time raster, whereas the contents of normal slots (DA) may be shifted in said time raster relative to said special slots by any station.

6. Method according to claim 5, comprising the further steps of:

issuing said slots in consecutive cycle frames (CF); marking at least the first slot of each cycle frame as a signaling slot (SG); marking a portion of the slots of each cycle frame as isochronous slots (IS); said signaling slots and isochronous slots constituting said special slots; and marking the remainder of the slots in each cycle frame as normal slots (DA).

7. Method according to claim 6, comprising the additional steps of:

issuing at the end of each cycle frame (CF) a trailing slot (TR) having initially the standard size of a time slot; and in each station, adapting the size of said trailing slot so that it fills the time till the start of the next cycle frame (CF); thereby enabling synchronous operation of the whole system despite individual station clocks.

8. Method according to claim 5, wherein each special slot is either a signaling slot (SG) for the transfer of signaling information, or an isochronous slot (IS) for the isochronous transfer of data; each of said stations using any free signaling slot when it has signaling information to be transmitted; and each of said stations using any free isochronous slot for the transfer of isochronous data only if said station has been previously authorized.

9. Method according to claim 5, in a system in which each station generates data frames (DF) of variable length for transmission over said ring, and transfers their contents into its transmit buffer (TB); comprising:

inserting sections of a data frame (DF) each corresponding to the size of a time slot, consecutively into free normal slots (DA) for transmission on said ring;

generating a slot header for each slot into which data of a data frame (DF) are inserted, indicating whether the respective slot is the first slot (F), an intermediate slot (M), or the last slot (L) in a sequence of slots carrying data from one data frame, or whether it is a single slot (S) carrying all the data of a data frame.

10. Method according to claim 5 or claim 9, comprising the following steps after detection of a normal slot (DA):

(a) testing whether the transmission of data from a local data frame (DF) stored in a transmit buffer (TB) had been previously started and was not yet finished;

if yes: transmitting the next section of the data frame from the transmit buffer in the normal slot (DA);

if no: testing whether the delay buffer (DB) is empty or not; then (b) if the delay buffer is not empty: transmitting a slot contents from the delay buffer in the normal slot (DA);

(c) if the delay buffer is empty; testing whether the transmit buffer is empty;

if no: starting transmission on data from a local data frame (DF) stored in said transmit buffer and transmitting the first section of that data frame from the transmit buffer in the normal slot (DA);

if yes: regenerating a free normal slot (DA) for transmission on the ring.

* * * * *